(12) United States Patent
Kumawat et al.

(10) Patent No.: US 11,367,231 B2
(45) Date of Patent: Jun. 21, 2022

(54) SYSTEM FOR GENERATING SNAPPING GUIDES FOR A MULTI-PATH GLYPH

(71) Applicant: ADOBE INC., San Jose, CA (US)

(72) Inventors: Nirmal Kumawat, Noida (IN); Pawan Kishor Singh, Noida (IN)

(73) Assignee: Adobe Inc., San Jose, CA (US)

( * ) Notice: Subject to any disclaimer, the term of this patent is extended or adjusted under 35 U.S.C. 154(b) by 71 days.

(21) Appl. No.: 17/077,496

(22) Filed: Oct. 22, 2020

(65) Prior Publication Data
US 2022/0130085 A1    Apr. 28, 2022

(51) Int. Cl.
*G06T 11/60*    (2006.01)
*G06F 40/103*   (2020.01)
*G06T 3/00*     (2006.01)

(52) U.S. Cl.
CPC ............ *G06T 11/60* (2013.01); *G06F 40/103* (2020.01); *G06T 3/0068* (2013.01); *G06T 2210/12* (2013.01)

(58) Field of Classification Search
CPC ........ G06T 11/60; G06T 11/221; G06T 11/12; G06T 3/0068; G06T 3/0081; G06F 40/103
See application file for complete search history.

(56) References Cited

U.S. PATENT DOCUMENTS

2018/0218523 A1\* 8/2018 Dhanuka ................. G06T 11/60
2019/0317980 A1\* 10/2019 Dhanuka ............... G06F 40/109

\* cited by examiner

*Primary Examiner* — Michelle L Sams
(74) *Attorney, Agent, or Firm* — Shook, Hardy & Bacon L.L.P.

(57) ABSTRACT

Systems and methods provide snap-line generation operations for live multi-path glyphs. In this regard, an attribute extraction component accesses a glyph description of a live multi-path glyph to determine and store several attributes related to at least one sub-path of the live multi-path glyph. The stored attributes are accessed by a snap-line generation component and used to determine whether an external object is moved near the live multi-path glyph. When moved near one another, a snap-line is generated along sub-path planes of the external object and the live multi-path glyph. Generated snap-lines are used to aid a user in aligning the two objects.

20 Claims, 11 Drawing Sheets

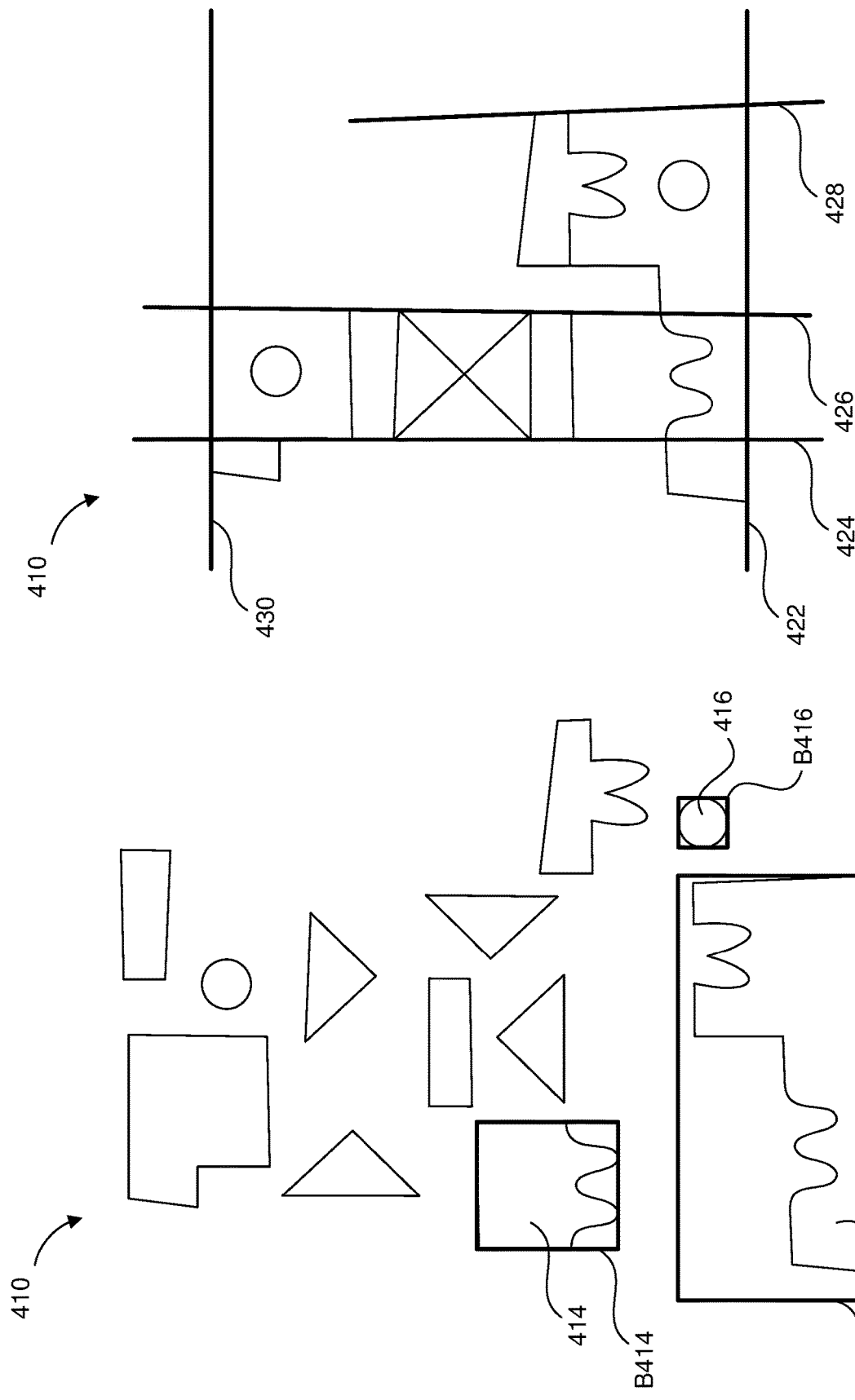

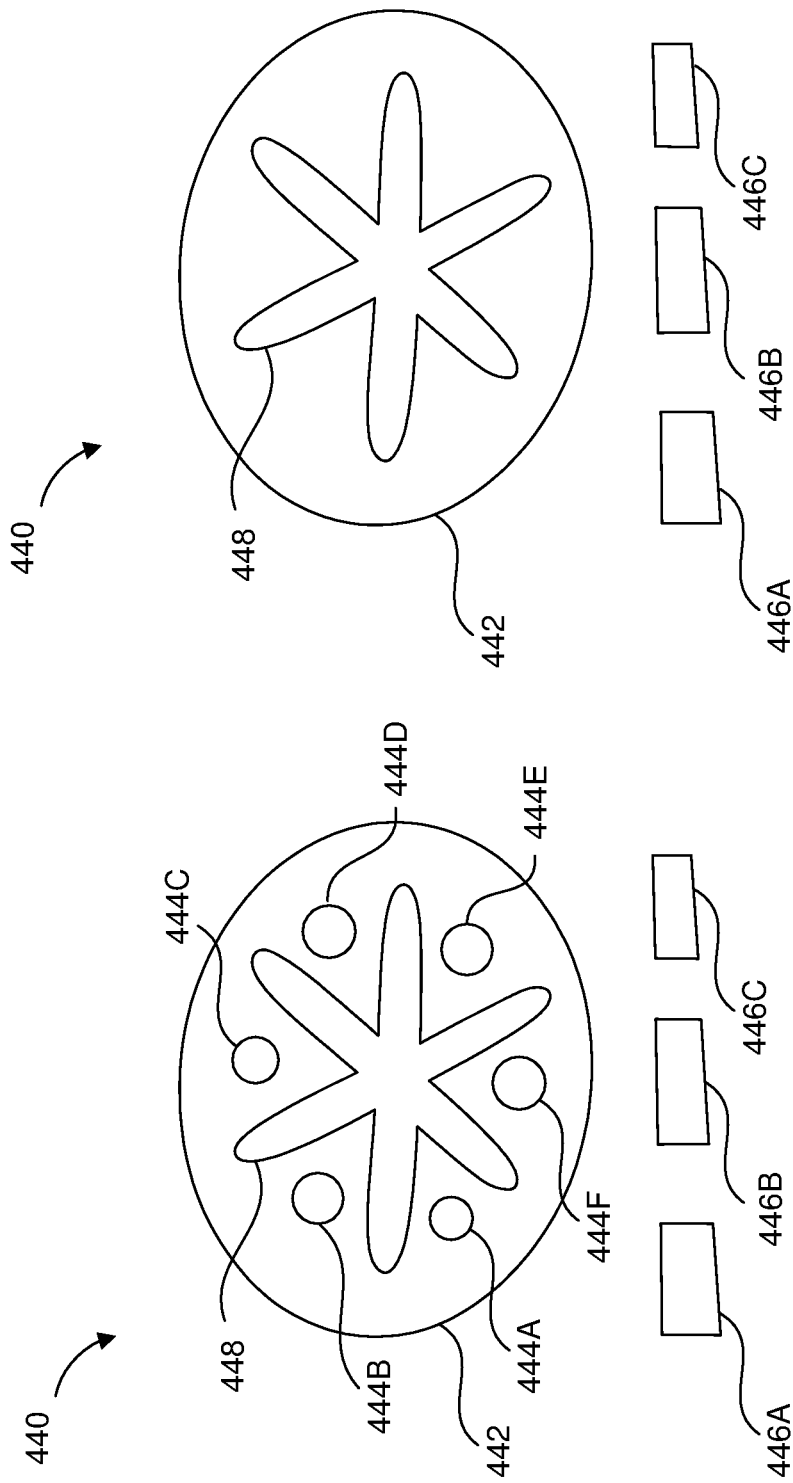

__

SYSTEM FOR GENERATING SNAPPING GUIDES FOR A MULTI-PATH GLYPH

BACKGROUND

Users often rely on snapping guides to precisely align objects with one another when creating content in a document, such as a poster, flyer, brochure, magazine or other type of presentation. Snapping guides allow users to easily align some aspect of an object with an aspect of another object by causing the object to automatically jump (i.e., reposition) to an exact alignment position when the user moves the object in proximity to a desired location. As precisely positioning objects relative to each other can be a time consuming and difficult task, automatic alignment between objects is often an integral part of any designing/drawing application.

Conventional systems for generating snapping guides are unaware of any internal paths and/or parts of a live glyph. As such, these traditional systems are unable to generate snapping guides that extend from the internal paths and/or parts of a live glyph. Some conventional systems can provide users with an option to vectorize a glyph and convert the glyph from a live format to a graphic format. Once converted to a graphic format, these conventional systems can generate snapping guides for a graphic of the glyph. However, once converted, the glyph is no longer live, which means that a user loses the ability to search for the glyph, change a font type, italicize, underline, bold, strikethrough, change the glyph from lowercase to capital, and/or edit the glyph by merely typing on a keyboard.

SUMMARY

Various aspects of the technology described herein are generally directed to systems, methods, and computer storage media for, among other things, improving smart guide generation for live multi-path glyphs. In this regard, an attribute extraction component accesses a glyph description of a live multi-path glyph to determine and store several attributes (e.g., bounding boxes, relevant line segments, inner vs. outer tag, and a unique identifier) related to at least one sub-path of the live multi-path glyph. The stored attributes are used to determine whether an external object is moved near the live multi-path glyph and, when moved near one another, generate snapping guides between components of the external object and the live multi-path glyph, which are used to aid a user in aligning the two objects. For example, in a document that includes two text objects, the system fetches all bounding boxes and all relevant line segments for each of the two text objects. Then, as a user moves the text objects relative to each other, an algorithm runs in real-time to determine intersections with coordinate planes of the bounding boxes and relevant line segments of the two text objects. When an intersection between two or more points along a plane is determined, or the two or more points are determined to be within a threshold distance, a snap line is generated between common points on the two text objects. Advantageously, a user is presented with snapping guides that are associated with sub-paths of a multi-path glyph while the multi-path glyph remains live, which is not available in conventional systems.

In some embodiments, a sub-path filtering component is employed filter out sub-paths that are associated with a bounding box whose area is less than a defined threshold. For example, if a bounding box area for a sub-path is less than a threshold value, then the sub-path will be excluded from consideration for alignment and no snapping guides will be generated for the sub-path when a user moves another object near a plane of the sub-path. In further embodiments, a snap-line generation component accesses a skew angle associated with a glyph and applies the skew angle to components of the glyph from which snapping guides are generated.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The present systems and methods for generating snapping guides for a multi-path glyph are described in detail below with reference to the attached drawing figures, wherein:

FIGS. 4A-4H illustrate example operations for determining snapping guides for multi-path glyphs;

DETAILED DESCRIPTION

Figure 1:
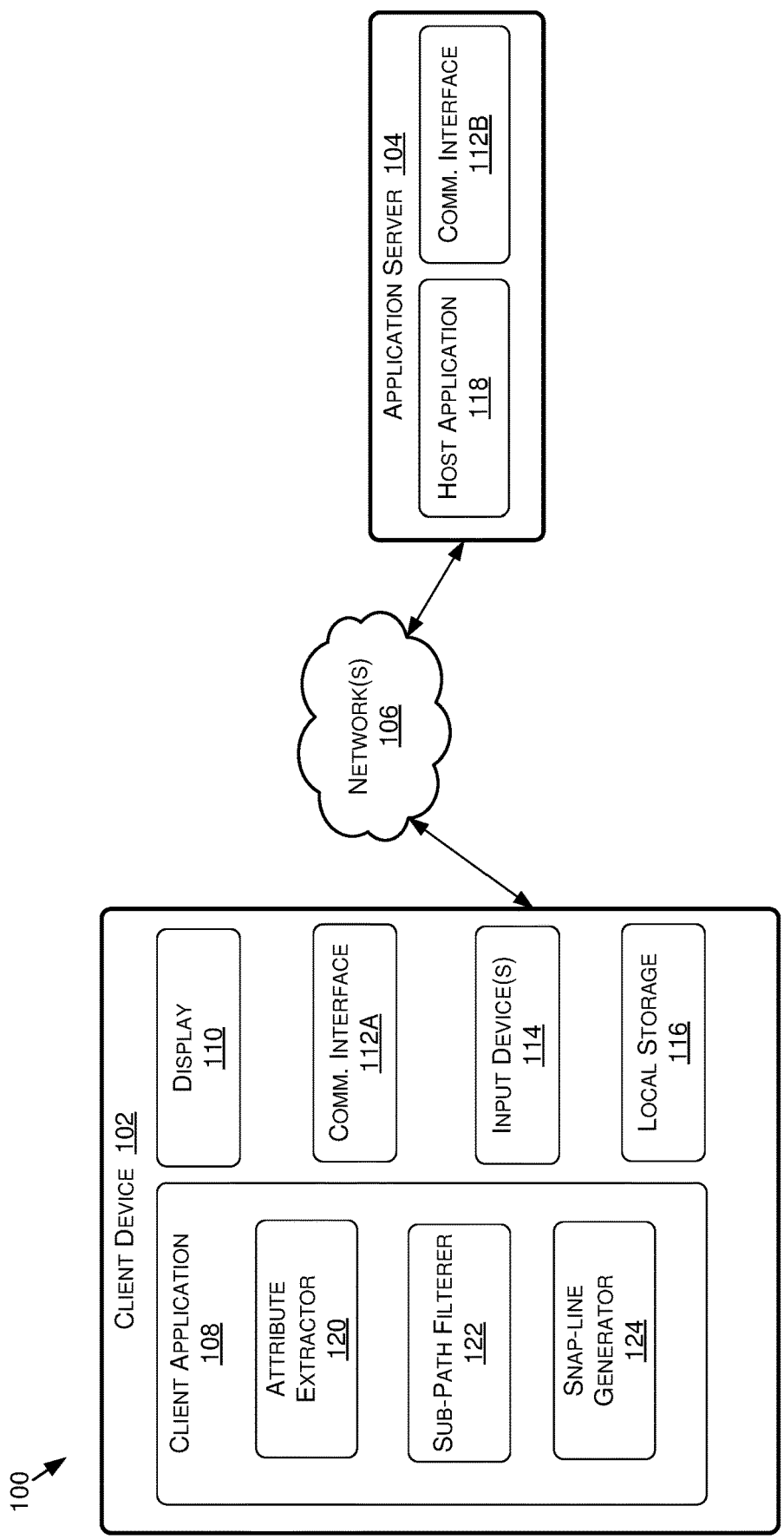
FIG. 1 illustrates an exemplary computing environment suitable for implementing embodiments of the present invention.

Systems and methods are disclosed related to extracting data corresponding to sub-paths of glyphs and generating snap-lines that extend along various planes that are determined for each of the sub-paths. The present invention has been described in relation to particular embodiments, which are intended in all respects to be illustrative rather than restrictive. Alternative embodiments will become apparent to those of ordinary skill in the art to which the present invention pertains without departing from its scope.

By way of further background, users often rely on snapping guides to precisely align an object with another object when creating content. These snapping guides allow an object to be easily positioned in alignment with another object. For example, when known points or planes of two objects are within a threshold distance of each other, one of the objects can automatically jump (i.e., snap) to an exact position As precisely positioning objects relative to each other can be a time consuming and difficult task, automatic alignment between objects is often an integral part of any designing/drawing application. However, traditional systems are unaware of any internal parts of a live glyph. As such, these traditional systems are unable to generate snapping guides that extend from the internal parts of a live glyph. For example, a smiley emoji includes eyes, a mouth, and a baseline for aligning the emoji on a line of text. While traditional systems may be able to generate a snapping guide from the known baseline, these traditional system are unaware of the eyes and/or mouth of the emoji and, as such, are unable to generate snapping guides based on the eyes and mouth of the smiley emoji. Thus, a user wishing to align an object with the eyes or mouth of the smiley emoji must manually attempt to align the object with the eyes or mouth.

Conventional systems provide users with an option to convert a glyph from a live format to a graphic format by vectorising the glyph. Once converted to a graphic format, a traditional system generates snapping guides for the graphic of the glyph in the same manner as a snapping guide might be generated for any graphic. However, once converted, the glyph is no longer live, which means that properties associated with live text are lost. Properties associated with live text include, but are not limited to, the ability to search the text, change a font type, italicize, underline, bold, strikethrough, change a glyph from lowercase to capital, and edit text by merely typing on a keyboard. For example, in a string of live text where a user wishes to italicize "Lorem", the user can simply select the string of text and select to italicize the string of text. However, if the string has been converted to a graphic format, the user cannot italicize the string of text by highlighting the text and selecting to italicize the string of text because the string of text is now a graphic. Instead, the user is forced to start over by deleting the graphics, retyping the string of text, italicizing the string of text and then reconverting the string of text from a text format to a graphic format. As altering text once it has been converted to a graphic format can often be a frustrating, cumbersome and time consuming task, users often leave text in its original format as long as possible. Thus, these users are unable to take advantage of snapping guides that correspond to elements of the text.

Accordingly, embodiments of the present invention are directed to streamlined and efficient methods, systems, and computer storage media for improving snapping guide operations by extracting data corresponding to sub-paths of glyphs and generating snap-lines based on the extracted data in a computing environment. Each sub-path of a multi-path glyph is generated and placed at a fixed position by a font designer. As such, each of these sub-paths has unique attributes relative to the overall multi-path glyph.

In some embodiments, an attribute extraction component accesses a glyph description to determine several attributes related to at least one sub-path of a multi-path glyph, which has multiple closed sub-paths within the multipath glyph. Attributes related to a sub-path include, but are not limited to, a bounding box, a bounding box area, and relevant line segments (e.g., horizontal lines, vertical lines, and nearly linear lines). Information in the glyph description is parsed to determine a path description for each sub-path. These path descriptions are used to determine a bounding box for each sub-path within the glyph. For example, the path description is used to determine a set of coordinates for generating a bounding box around the sub-path. Further, in some embodiments, a bounding box area is also calculated based on the set of coordinates for the bounding box, a glyph font size, and a zoom level for displaying the glyph, as discussed further herein. Additionally, line segments are identified by analyzing segments of all sub-paths of a glyph. For example, by analyzing these segments of sub-paths, linear paths connecting multiple sub-paths are identified. A line segment of a sub-path comprises two anchor points which are directly connected without any other anchor or control points in-between the two anchor points. Further, curve segments which are only slightly curved but are nearly linear are also identified as being linear. For example, a line segment with a radius within a defined threshold is considered linear for purposes of identifying relevant linear segments. A curve segment of a sub-path comprises two anchor points that are connected through at least one control point. Hence, a linear path can be identified from line segments and curve segments which are nearly linear.

Sub-path attributes, such as those mentioned above, are stored in a mapping in association with corresponding sub-paths of a glyph. Additionally, a unique identifier (ID) is assigned to each sub-path as well as a tag to identify whether a sub-path is an inner sub-path or an outer sub-path. An inner sub-path is a closed path, which is completely enclosed by another closed sub-path. For example, an inner sub-path can be identified by determining that each point of the sub-path is found within another closed sub-path. Similarly, an outer sub-path is a closed path, which is not enclosed by another closed sub-path. The unique ID and inner versus outer sub-path information are also mapped in association with a corresponding sub-path.

In further embodiments, the stored attributes are used to determine whenever an external object is moved around a glyph or other text object and generate snapping guides (i.e., snap-lines). For example, in a document that includes two text objects, the system fetches all bounding boxes and all relevant line segments for each of the two text objects. Then, as a user moves the text objects relative to each other, an algorithm runs in real-time to determine intersections with coordinate planes of the bounding boxes and relevant line segments of the two text objects, as described in additional detail in FIG. 3. When an intersection between two or more points along a plane is determined, or the two or more points are determined to be within a threshold distance (e.g., a xMin of a first bounding box is within a threshold distance of a xMin of a second bounding box), a snap line is generated between common points on the two text objects. The snap line is then displayed. While the discussion provided herein discusses two text objects, this is not intended to be limiting and the embodiments described herein may be extended for providing snapping guides for two or more text objects. Further, embodiments described herein are not limited to text objects and may be modified to fetch bounding boxes and relevant line segments for other types of graphic objects in order to generate snapping guides.

In some embodiments, some sub-paths are removed from consideration for snapping guide generation based, at least in part, on stored attributes for the sub-paths. As some glyphs are composed of a substantial amount of very small sub-paths, displaying snapping guides for every sub-path often introduces unnecessary snapping candidates that clutter a user's view. As such, it is advantageous to filter out some of these very small sub-paths. A sub-path filtering component is employed filter out sub-paths that are associated with a bounding box whose area is less than a defined threshold. The area of a bounding box for a particular sub-path varies depending on a font size and a zoom level for displaying a glyph containing the particular sub-path. For example, if a user selects to adjust a zoom level from 100% to 150%, a bounding box for visible sub-paths will occupy a larger area of the user's display at a zoom level of 150% compared to a zoom level of 100%. Each determined bounding box area is then compared against a threshold value. If the bounding box area for a sub-path exceeds the threshold value, then snapping guides are generated in accordance with the systems and methods described herein. If the bounding box area for a sub-path is less than the threshold value, then the sub-path will be excluded from consideration and no snapping guides will be generated for the sub-path. In some embodiments, only inner sub-paths are filtered out and all outer sub-paths will be considered for snapping guide generation, regardless of the bounding box area of the outer sub-path.

A glyph can be italicized, slanted or a user may apply some other synthetic skew angle to the glyph. For example a user might select the glyph and select to apply a 15 degree skew angle to the glyph. It may be advantageous to align an external object with the angle of the glyph. As such, in some embodiments, the snap-line generation component accesses a skew angle associated with a glyph (e.g., a manually applied skew angle, a default skew angle associated with the glyph or glyph font, a skew angle applied based on a user selecting to italicize the glyph) and applies the skew angle to components of the glyph from which snapping guides are generated. For example, the skew angle can be applied to bounding boxes or relevant line segments for a glyph so that snapping guides that are generated based on these components follow the same skew angle as that which is applied to the glyph.

Having briefly described an overview of aspects of the present invention, various terms used throughout this description are provided. Although more details regarding various terms are provided throughout this description, general descriptions of some terms are included below to provider a clearer understanding of the ideas disclosed herein:

Glyph: A glyph is a shape which is represented by at least one closed path such as a Bezier path. For example, a glyph can be in the form of a text object, an emoji, or other scalable vector graphic format. Glyphs are considered to be unique marks that collectively add up to the spelling of a word or contribute to a specific meaning of what is written, with that meaning dependent on cultural and social usage.

Snap-line: A snap-line (also referred to herein as a snapping guide and a snapping line) is a graphical guide to aid a user in precisely aligning objects with one another when creating content in a document, such as a poster, flyer, brochure, magazine or other type of presentation. Snapping guides extend in a straight line from features of an object. Snap-lines allow users to easily align some feature of an object with a feature of another object.

Glyph Description: A glyph description is a code file for a particular glyph that can define shapes, gradients, colors, paths, etc. required to generate the particular glyph. For example, in OpenType spec 1.8, a table 'SVG' contains a glyph description in the form of a scalable vector graphic (SVG) format. As such, a glyph may be represented in a colorful graphic in the font itself and a glyph description can include outline information along with multiple colors, multiple sub-paths, gradients, patterns etc. in the font-file.

Sub-path: A sub-path is a vector path which makes up part of an overall glyph. The sub-path data contains moveto, lineto, curveto (both cubic and quadratic Béziers), arc, and closepath instructions. A sub-path has a unique position within the overall glyph.

Live Glyph: A live glyph is an editable glyph that is typed into a document. For example, with live glyphs, a user is able to search the glyphs of a string of text, change a font type, italicize, underline, bold, strikethrough, change a glyph from lowercase to capital, and edit the glyphs by merely typing on a keyboard.

Bounding Box: A bounding box is an enclosed rectangular box/border which encompasses every point of a sub-path. Further, as used herein, a bounding box is defined by coordinates of the enclosed rectangular box/border and is the smallest area in which every point of a sub-path lies.

Skew Angle: A skew angle is an angle that is applied selected text to slant the selected text along its horizontal axis.

Sub-path Plane: A sub-path plane is a flat, two-dimensional surface that extends infinitely far. Sub-path planes extend along each border of a bounding box for a sub-path, as well as along each line segment for a sub-path. Sub-path planes correspond to potential snapping lines.

Line Segment: A line segment of a sub-path comprises two anchor points which are directly connected without any other anchor or control points in-between the two anchor points.

Curve Segment: A curve segment of a sub-path comprises two anchor points that are connected through at least one control point.

Aspects of the technical solution can be described by way of examples and with reference to FIG. 1. FIG. 1 illustrates an exemplary computing environment 100 suitable for implementing embodiments of the present invention. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory.

Generally, the computing environment 100 includes, among other things, client device 102 and an application server 104. Although a single client device 102 and application server 104 are illustrated in FIG. 1, this is not intended to be limiting. The computing environment 100 (and the components and/or features thereof) is implemented using one or more computing devices.

Components of the computing environment 100 communicate over network(s) 106. The network(s) may include a wide area network (WAN) (e.g., the Internet, a public switched telephone network (PSTN), etc.), a local area network (LAN) (e.g., Wi-Fi, ZigBee, Z-Wave, Bluetooth, Bluetooth Low Energy (BLE), Ethernet, etc.), a low-power wide-area network (LPWAN) (e.g., LoRaWAN, Sigfox, etc.), a global navigation satellite system (GNSS) network (e.g., the Global Positioning System (GPS)), and/or another network type. In any example, each of the components of the computing environment 100 communicate with one or more of the other components via one or more of the network(s) 106.

The client device 102 may include a smart phone, a laptop computer, a tablet computer, a desktop computer, a wearable device, a virtual reality system (e.g., a headset, a computer, remote(s), controller(s), and/or other components), a streaming device, or another type of device capable of supporting content creation or other application types, depending on the embodiment or implementation, and/or a combination thereof. The client devices 102 further includes a client application 108, a display 110, a communication interface 112, an input device(s) 114, and local storage 116. Although only a few components and/or features of the client devices 102 are illustrated in FIG. 1, this is not intended to be limiting.

The client application 108 is a mobile application, a computer application, and/or another type of application. In some embodiments, the client application 108 is a content generation application. In further embodiments, the client application 108 is included in or relied on by a content generation application. The client application 108 includes an attribute extractor 120, a sub-path filterer 122 and a snap-line generator 124.

In operation, the attribute extractor 120 accesses a glyph description of a live glyph to determine several attributes related to at least one sub-path of the glyph, which has multiple closed sub-paths within the glyph (e.g., multi-path glyph). To determine attributes related to a sub-path, some attributes, such as vector data describing a sub-path, are extracted from the glyph description by the attribute extractor 120. By way of example, a glyph description may be represented as follows:

```
<svg id="glyph60" xmlns="http://www.w3.org/2000/svg"
viewBox="0 54.4 64 64">
  <circle fill="#ffdd67" cx="32" cy="32" r="30"/>
<g fill="#664e27">
  <path d="m17.316 40.949c2.475 1.455 4.865 2.338 7.314
2.924 2.439.586 4.9.836 7.369.84 2.471-.01 4.93-.26 7.367-
.846 2.449-.586 4.838-1.467 7.316-2.918-1.061 2.717-3.416
4.854-6.04 6.221-2.654 1.379-5.662 2.043-8.641 2.041-
2.979-.004-5.984-.668-8.637-2.047-2.625-1.367-4.98-
3.502-6.05-6.215"/>
  <circle cx="20.502" cy="26.592" r="4.5"/>
  <circle cx="43.502" cy="26.592" r="4.5"/>
</g>
</svg>
```

Other attributes related to a sub-path are calculated or otherwise determined by the attribute extractor 120. For example, a unique identifier is assigned to each sub-path, each sub-path is tagged as an inner sub-path or an outer sub-path, a bounding box for each sub-path is determined, and relevant line segments are determined. Each of these attributes is mapped to a corresponding sub-path, which is stored in local storage 116 at the client device 102 or on the application server 104.

The sub-path filterer 122 filters out small sub-paths based on determining a bounding box area for each sub-path and determining whether the bounding box area is less than a defined threshold. The bounding box area represents an area occupied by a sub-path bounding box on display 110. The bounding box area is determined as a percentage of the total screen resolution, a number of pixels, or some other unit measure (e.g., $in^2$, $cm^2$, etc.). As the bounding box area relates to an occupied area on the display 110, the area of a bounding box for a particular sub-path varies depending on a font size of a glyph and/or a zoom level applied to an application window of the client application 108. Once a bounding box area has been determined, the bounding box area is compared against a threshold value. The threshold value for filtering may be defined by a software developer and stored as a default value in the client application 108 or the threshold area may be a user defined threshold area that is adjusted by the user. If the bounding box area for a sub-path is less than the threshold value, then the sub-path is filtered out. In some embodiments, only inner sub-paths are filtered out and all outer sub-paths will be considered for snapping guide generation by the snap-line generator 124, regardless of the bounding box area of the outer sub-path.

The snap-line generator 124 accesses a set of attributes mapped to one or more sub-paths from the local storage 116 to determine whenever a sub-path plane of an external object intersects with, or is within a threshold distance of, a sub-path plane of a glyph or other text object. When an intersection is determined, or the sub-path planes are determined to be within a threshold distance of one another, a snap-line is generated along the sub-path plane of whichever object is stationary. For example, if a user is moving a first object near a second object, the snap-line generator 124 determines that sub-path planes of the two objects are within a threshold distance of each other. Based on this determination, the snap-line generator 124 generates snap-line along the sub-path plane of the second object to aid the user in aligning the first object with the second object. In some embodiments, the snap-line generator generates a snap-line along both sub-path planes. In such embodiments, the user moves one of the objects to align the two snap-lines and, once aligned, the client application 108 generates a graphical indication via display 110 to indicate to the user that the sub-path planes are exactly aligned. For example, the snap-lines may change color, change weight, change from dashed to solid, highlight, or present some other type of graphical indication to the user.

In some embodiments, the snap-line generator 124 accesses a skew angle applied to a glyph. For example, a user may italicize a glyph or otherwise apply a skew angle to a glyph via client application 108. The skew angle is then be applied, by the snap-line generator 124, to sub-path planes of the glyph, as discussed further in FIG. 5.

The client application 108 and/or patches or updates to the client application 108 are downloaded from the application server 104 or, in some embodiments, are downloaded from another server(s), such as a server of a content delivery network (CDN). For example, the application server 104 may be located in a different country or on a different continent, so to reduce the download time, the client application 108 and/or the patches or updates may be stored on different servers around the globe. As such, when the client devices 102 are downloading the client application 108 and/or the patches or updates, the client devices 102 may connect to a more local server that is part of the CDN, for example.

In some embodiments, the snap-line generation operations described herein are executed exclusively on the client device 102, while in other examples, the snap-line generation operations are executed, at least in part, on the application server 104. For example, a user might generate content via a cloud application (e.g., host application 118) that is capable of performing the snap-line generation operations discussed herein via client application 108 on client device 102. The client application 108 communicates via the communication interface 112A, over network(s) 106, to communication interface 112B. User commands received via input device(s) 114 are transmitted over networks(s) 106 to execute the user commands on the host application 118 at the application server 104. The host application 118 includes substantially similar components to those included in the client application 108. As such, the snap-line generation operations described herein may be incorporated into, and performed via, cloud based software for graphic design, video editing, web development, and/or photography, such as software included in Adobe Creative Cloud®.

The display 110 includes any type of display capable of displaying the client application 108 (e.g., a light-emitting diode display (LED), an organic LED display (OLED), a liquid crystal display (LCD), an active matrix OLED display (AMOLED), a quantum dot display (QDD), a plasma display, an LED/LCD display, and/or another type of display). In some examples, the display 110 includes more than one display (e.g., a dual-monitor display for content generation). In some examples, the display is a touch-screen display, such as a touch-screen of a smart phone, tablet computer, laptop computer, or the like, where the touch-screen is at least one of the input device(s) 114 of the client devices 102.

The input device(s) 114 includes any type of devices that are capable of providing user inputs to the application. The input device(s) may include a keyboard, a mouse, a microphone(s), a touch-screen display, a controller(s), a remote(s), a headset (e.g., sensors of a virtual reality headset), and/or other types of input devices.

The communication interface 112A, 112B, (referred to collectively herein as "communication interfaces 112") include one or more components and features for communicating across one or more networks, such as the network(s) 106. The communication interfaces 112 is configured to communicate via any number of network(s) 106, described herein. For example, to communicate in the computing environment 100 of FIG. 1, the client devices 102 may use an Ethernet or Wi-Fi connection through a router to access the Internet in order to communicate with the application server(s) 104.

The local storage 116 includes any of a variety of computer-readable media. The computer-readable media is any available media that can be accessed by the client device 102. The computer-readable media may include both volatile and nonvolatile media, and removable and non-removable media. By way of example, and not limitation, the computer-readable media may comprise computer-storage media and communication media. The local storage 116 may include additional or alternative components, such as those described below with respect to the memory 812 of FIG. 8.

Figure 2A:
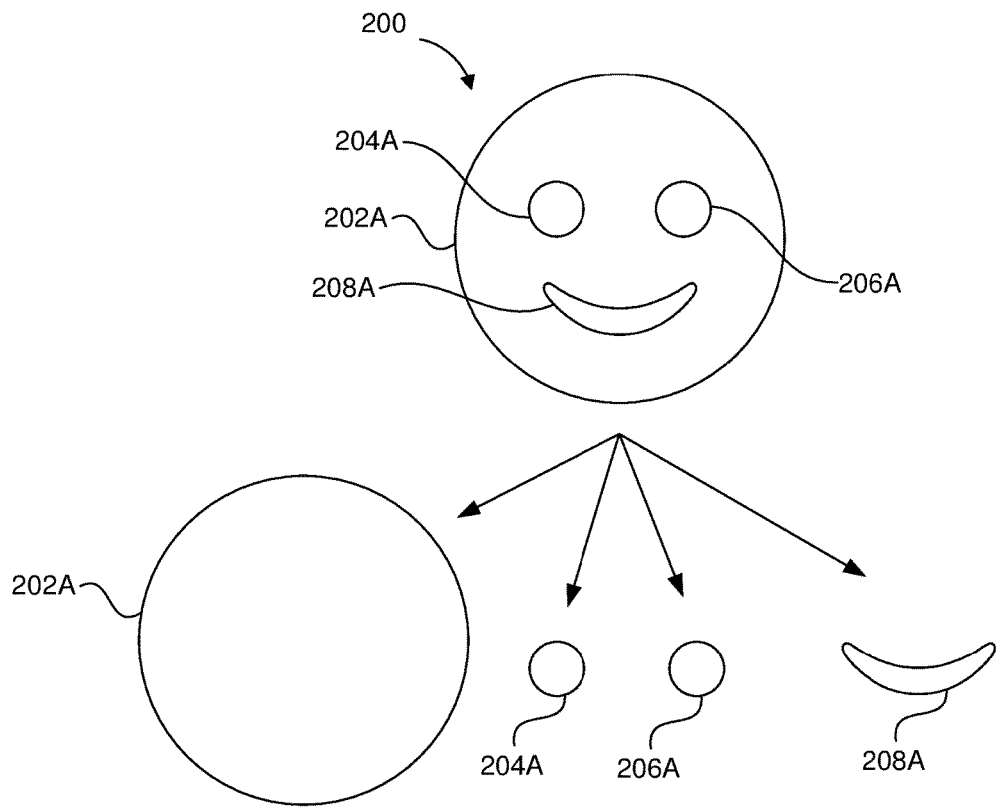
FIGS. 2A-2C illustrate an example snap-line generation operation, in accordance with embodiments of the present invention.
Figure 2B:
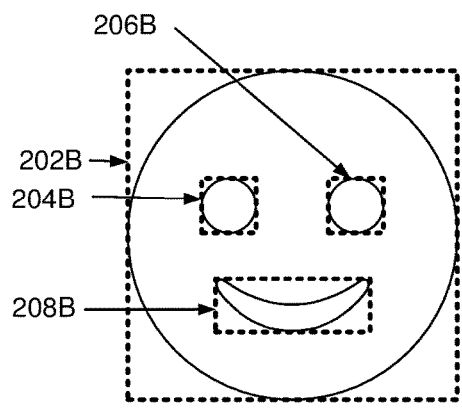
Figure 2C:
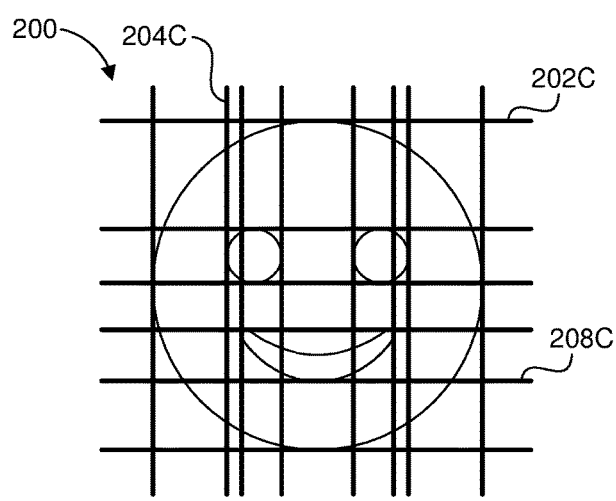

Now turning to FIGS. 2A-2C, FIGS. 2A-2C illustrate an example snap-line generation operation, in accordance with embodiments of the present invention. FIG. 2A includes a "smiley" emoji 200 (i.e., emoji 200), which is a multi-path glyph. The path of the emoji 200 includes sub-path 202A corresponding to an outer circle of the emoji 200, sub-paths 204A and 206A each corresponding to an inner circle of the emoji 200 (e.g., the eyes of the emoji), and sub-path 208A corresponding to a closed crescent shape of the emoji 200 (e.g., the mouth of the emoji). Each of the sub-paths 202A, 204A, 206A, and 208A is placed at fixed positions by a font-designer to create the emoji 200, which is to say that each sub-path has a unique position in the overall path of the emoji 200. A glyph description of the overall path of the emoji 200 is parsed to identify each of the sub-paths 202A, 204A, 206A, and 208A. Further, each of the sub-paths 202A, 204A, 206A, and 208A is tagged as being an inner sub-path or an outer sub-path. For emoji 200, sub-path 202A is tagged as an outer sub-path because sub-path 200 is not enclosed by any other sub-path. Sub-paths 204A, 206A, and 208A are each tagged as inner sub-paths because each of these sub-paths are fully enclosed by sub-path 202A.

For each of the sub-paths 202A, 204A, 206A, and 208A, a bounding box is determined. As can be seen in FIG. 2B, bounding box 202B corresponds to sub-path 202A, bounding box 204B corresponds to sub-path 204A, bounding box 206B corresponds to sub-path 206A, and bounding box 208B corresponds to sub-path 208A. Each of the bounding boxes are the smallest enclosed rectangular box within which all the points along a corresponding sub-path lie. The sides of the bounding boxes define the sub-path planes for a particular sub-path. For example, bounding box 202B of sub-path 202A has two vertical sides and two horizontal sides. The two vertical sides are associated with minimum and maximum y values (e.g., yMin and yMax), while the two horizontal sides are associated with minimum and maximum x values (e.g., xMin and xMax). These minimum and maximum values are used to establish the sub-path planes for each of the sub-paths.

Turning to FIG. 2C, FIG. 2C illustrates emoji 200 showing each potential snap-line which is generated based on the sub-paths 202A, 204A, 206A, and 208A using their corresponding bounding boxes 202B, 204B, 206B, and 208B. Based on the sub-path planes at minimum and maximum values, snap-lines are generated along sub-path planes, as can be seen in FIG. 2C. By way of non-limiting example, snap-line 202C is generated along an xMax sub-path plane of bounding box 202B for sub-path 202A. Similarly, snap-line 204C is generated along an yMax sub-path plane of bounding box 204B for sub-path 204A. Further, snap-line 208C is generated along an yMin sub-path plane of bounding box 208B for sub-path 208A. Information associated with each potential snap-line is stored and mapped to each of the sub-paths 202A, 204A, 206A, and 208A of emoji 200. Moreover, as the emoji 200 is live text that is modified by a user, the snap-line generator 124 monitors user modifications to emoji 200, such as an applied skew angle, bolded text, font size, etc. and adjust the bounding boxes 202B, 204B, 206B, and 208B accordingly to generate accurate and useful snap-lines along updated sub-path planes.

Figure 3:
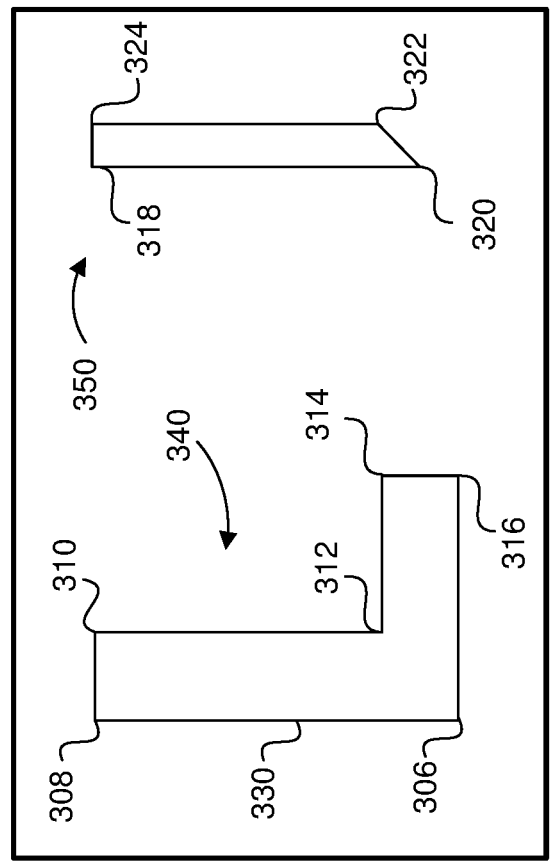
FIG. 3 illustrates an example glyph comprising multiple paths, in accordance with embodiments of the present invention.
Figure 3:
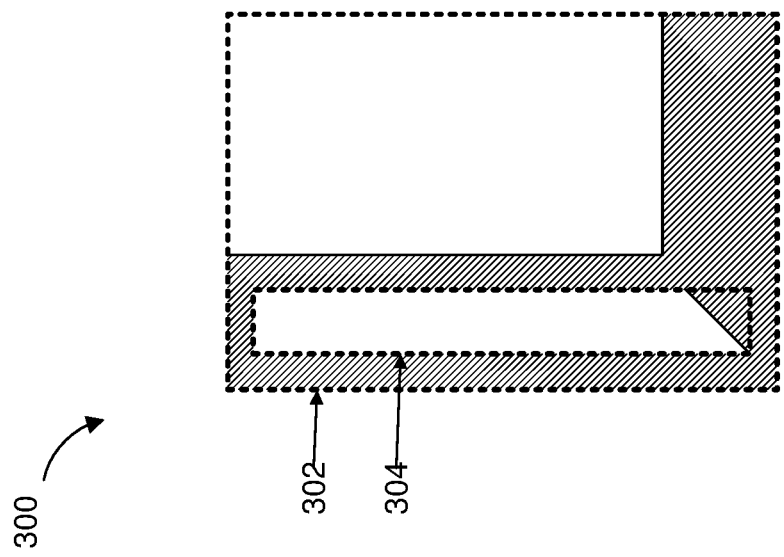

Now turning to FIG. 3, FIG. 3 illustrates an example glyph 300 comprising multiple paths, in accordance with embodiments of the present invention. As can be seen in FIG. 3, a portion corresponding to sub-path 340 of the glyph 300 is filled in and a portion corresponding to sub-path 350 of the glyph 300 is not filled in. Based on operations discussed herein, bounding box 302 and 304 are generated around sub-paths 340 and 350 respectively. Using data associated with the generated bounding boxes 302 and 304 (e.g., xMax, xMin, yMax, yMin) the structure of each bounding box is determined (e.g., bounding box structure={Float xMin, Float yMin, Float xMax, Float yMax}) and a bounding box array comprising the structure of each bounding box is determined (e.g., BBoxArray={bounding box 302, bounding box 304}). Further, several line segments are determined for glyph 300 based on points 306, 308, 310, 312, 314, 316, 318, 320, 322, and 324. For example, points 306 and 308 are defined as x, y coordinates at the ends of line 330. Points are determined at positions in a sub-path where a line experiences a sharp angular change (e.g., 90 degree change). Where a straight, or nearly straight, line exists along a sub-path between two points, a line segment is determined to exist. Where a line experiences a radial change, such as a curve, no point will be defined. Using each of points 306, 308, 310, 312, 314, 316, 318, 320, 322, and 324, a line array for sub-paths 340 and 350 is determined (e.g., LineArray={Line(point 306, point 308), Line(point 308, point 310), Line(point 310, point 312), Line(point 312, point 314), Line(point 314, point 316), Line(point 318, point 320), Line(point 320, point 322), Line(point 322, point 324)}).

As can be seen in FIG. 3, there are common lines between the bounding box array and the line array. For example, line 330 of sub-path 340 is the same as, and/or corresponds with, the xMin sub-path plane of bounding box 302. As such, in some embodiments, common lines are removed from the line array. Thus, for glyph 300, the resulting bounding box array would include bounding boxes 302 and 304 (e.g., BBoxArray={bounding box 302, bounding box 304}) and the resulting line array would remove lines that are along the same path as a sub-path plane of bounding boxes 302 and 304 (e.g., LineArray={Line(point 310, point 312), Line (point 312, point 314), Line(point 320, point 322)}).

The process described herein with respect to FIG. 3 is also performed, for example, on emoji 200 of FIG. 2. In such an example, a bounding box array would include bounding boxes 202B, 204B, 206B, and 208B (e.g., BBoxArray={bounding box 202B, bounding box 204B, bounding box 206B, bounding box 208B}) and a line array would be empty (e.g., LineArray=ID because each of sub-paths 202A, 204A, 206A, and 208A are completely curved and without any sharp or abrupt angular changes.

Using a bounding box array and line array associated with emoji 200 as well as a bounding box array and line array associated with glyph 300, snap-line generator 124 runs an algorithm in real-time to iteratively determine when the sub-path planes of the emoji 200 and the glyph 300 are within a threshold distance of intersecting with one another. When within the threshold distance, a snap-line is generated. For example, the snap-line generator 124 generates a vertical snap-line between common points if an x value (e.g., xMin or xMax) of any bounding box of emoji 200 is within a threshold distance of an x value of any bounding box of glyph 300. Similarly, the snap-line generator 124 generates a horizontal snap-line between common points if an y value (e.g., yMin or yMax) of any bounding box of emoji 200 is within a threshold distance of an y value of any bounding box of glyph 300. Further, if a line segment of the glyph 300 intersects with (e.g., or is within a threshold distance of intersecting) any point of a bounding box of emoji 200, then the snap-line generator 124 generates a snap-line along the path of a line segment of the glyph 300 that extend to, or beyond the point where the line segment of the glyph 300 intersects with the point of the bounding box of emoji 200.

An example algorithm to generate snapping guides is provided herein. For purposes of the example, assume two different text objects, T1 and T2, are present in a content creation application. Each of T1 and T2 will have a corresponding BBoxArray (i.e., bounding box array) and LineArray (i.e., line array). For purposes of the example algorithm, T1 will have BBoxArray1, LineArray1 and T2 will have BBoxArray2, LineArray2. The example algorithm will run as follows:

```
Algorithm Start
Input: BBoxArray1, BBoxArray2, LineArray1, LineArray2.
Output: SnapLinesVector.
Initialize SnapLinesVector as empty.
// find out the intersections between both text object's BboxArrays
and LineArrays.
Iterate (Bbox1 : BBoxArray1)
  Iterate (Bbox2 : BBoxArray2)
    If (BBox1.xMin == BBox2.xMin || BBox1.xMin == BBox2.xMax ||
       BBox1.xMax == BBox2.xMin || BBox1.xMax == Bbox2.xMax)
      Construct a VERTICAL snap line joining between Points
      which are common in both BBox1 and BBox2
      Insert the constructed snap line to output vector:
        SnapLinesVector.Insert(snapLine);
    If (BBox1.yMin == BBox2.yMin || BBox1.yMin == BBox2.yMax ||
       BBox1.yMax == BBox2.yMin || BBox1.yMax == Bbox2.yMax)
      Construct a HORIZONTAL snap line joining between Points
      which are common in both BBox1 and BBox2
      Insert the constructed snap line to output vector:
        SnapLinesVector.Insert(snapLine);
    Iterate (Line1 : LineArray1)
      If any point of BBox2 is intersected with Line1, then extend
      the Line1 till intersected point,
      And insert the extended line to output vector:
        SnapLinesVector.Insert(extendedLine1);
    Iterate (Line2 : LineArray2)
      If any point of BBox1 is intersected with Line2, then extend the
      Line2 till intersected point,
      And insert the extended line to output vector:
        SnapLinesVector.Insert(extendedLine2);
Return SnapLinesVector.
```

The resultant vector—SnapLinesVector—will contain lines that are needed to be drawn on a display screen when two text objects are placed/moved along with each other. The algorithm runs in real-time whenever a user performs an action of moving a text object (e.g., T1) along with other text object (e.g., T2).

Figure 4A:
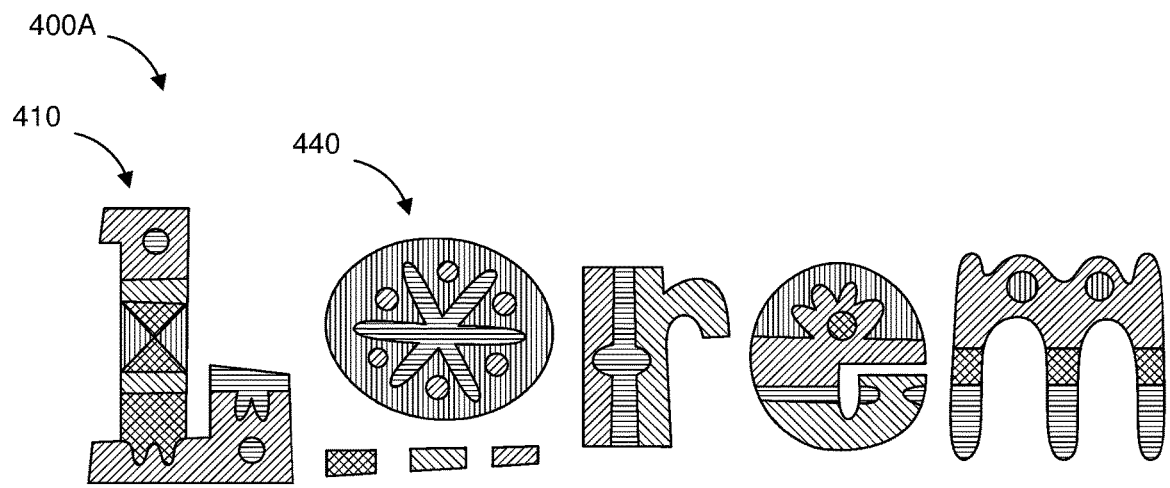
Figure 4B:
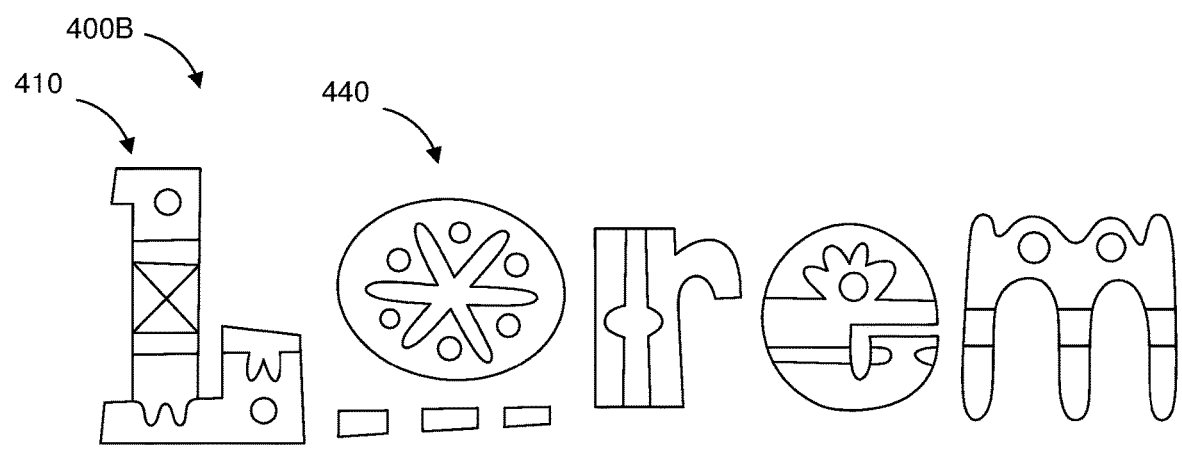

Now turning to FIGS. 4A-4H, FIGS. 4A-4H illustrate example operations for determining snapping guides for multi-path glyphs. Referring initially to FIG. 4A, FIG. 4A illustrates a string of glyphs 400A that read "Lorem". Each glyph of string of glyphs 400A is a vector based glyph. The string of glyphs 400A are written in a font that includes several variations of shading and/or colors and each individual glyph—such as glyph "L" 410 and glyph "O" 440 is comprised of several sub-paths (e.g., each glyph can have multiple small-small closed sub-paths within itself). When the string of glyphs 400A is input into a content generation application (e.g., client application 108 of FIG. 1), the system fetches an outline of each glyph of the string of glyphs 400A. The outline of each glyph of the string of glyphs 400A is illustrated as an outline the string of glyphs 400B in FIG. 4B. For example, as seen in FIG. 4B, the shading from the glyph "L" 410 and the glyph "0" 440 is removed and only an outline of each of the glyphs remains.

Figure 4D:
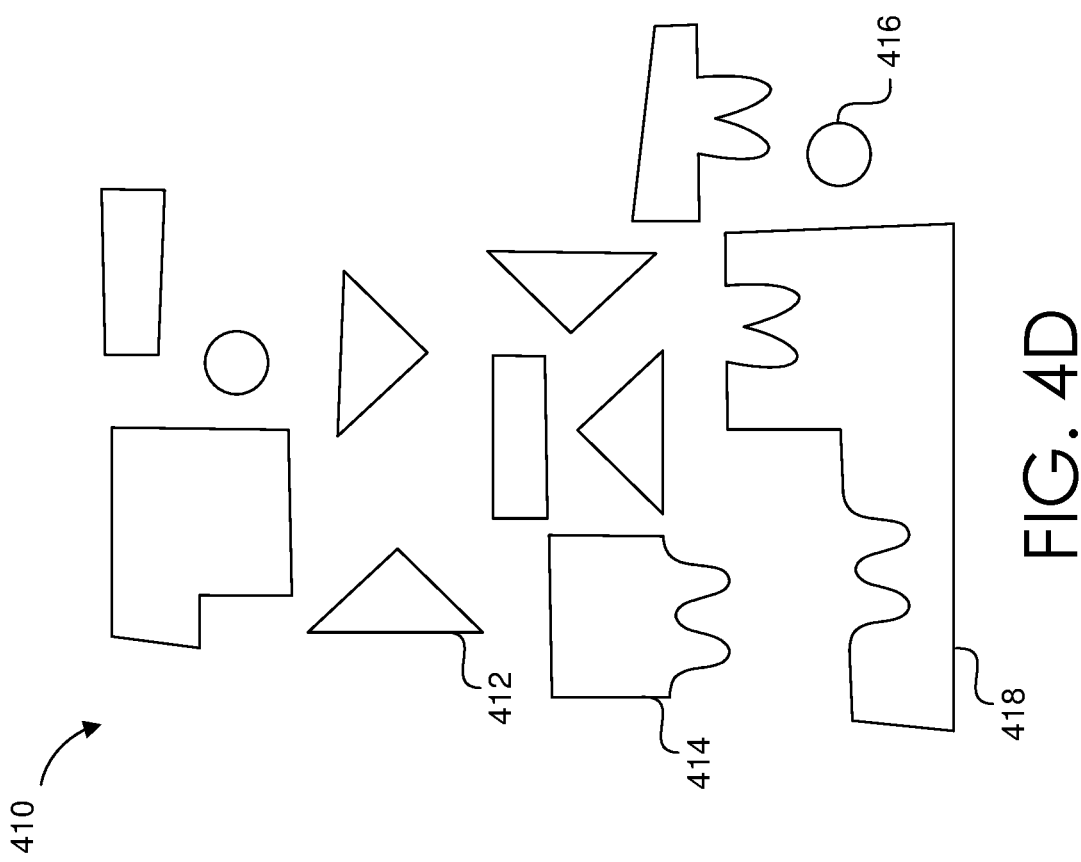
Figure 4C:
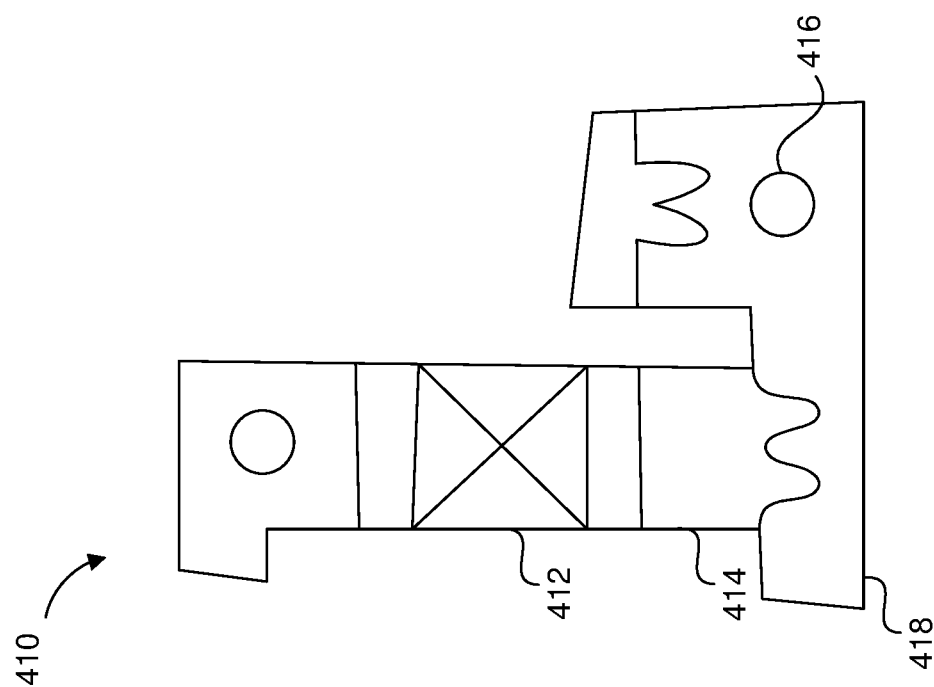

Turning to FIG. 4C, it can be seen that glyph "L" 410 comprises several complex shapes. In general, complex vector based fonts have complex shapes where each glyph can have a few closed outlines and thousands of small sub-paths. As it is not desirable to use every small sub-path for generating snapping lines, the system extracts only closed sub-paths (e.g., internal closed Bezier sub-paths) from the glyph outline. For example, as seen in FIG. 4C, the glyph "L" 410 includes sub-paths 412, 414, 416, and 418, among others. As a visual aid, FIG. 4D illustrates an isolated view of each of sub-paths 412, 414, 416, and 418. Each sub-path of glyph "L" 410, including each of sub-paths 412, 414, 416, and 418, is extracted and assigned a unique ID.

Turning to FIG. 4E, for each of sub-paths 412, 414, 416, and 418 of glyph "L" 410, a bounding box is determined (e.g., fetched, generated, and/or extracted). As shown in FIG. 4E, a bounding box B414 is determined for sub-path 414, a bounding box B416 is determined for sub-path 416, and a bounding box B418 is determined for sub-path 418. Similarly, though not shown in FIG. 4E, a bounding box will be determined for every sub-path of glyph "L"410. The dimensions of each bounding box are stored in association with a corresponding sub-path.

Turning to FIG. 4F, as mentioned herein, a glyph can have multiple sub-paths and each sub-path can be constructed of line and/or curve segments. The present system analyzes each of the glyph "L" 410 outline's internal sub-paths to identify all relevant line segments. For example, as shown in FIG. 4F, lines 422, 424, 426, 428, and 430 are each identified as example relevant line segments. It should be noted that all relevant line segments of the glyph "L" 410 will be identified by the system, as discussed herein, but are not illustrated in FIG. 4F so as to avoid overly cluttering FIG. 4F. Moreover, the system will identify all nearly linear lines in the glyph "L" 410, which is to say that a curve that is following an almost linear line, will be considered as a linear segment.

Turning to FIG. 4G, FIG. 4G illustrates glyph "0" 440. Glyph "0" 440 includes sub-paths 442, 444A-F, 446A-C, and 448. Each of sub-paths 444A-F and 448 are inner sub-paths because each point of each of sub-paths 444A-F and 448 is within the sub-path 442. Though not shown, each of sub-paths 442, 444A-F, 446A-C, and 448 includes a corresponding bounding box that is stored in association with each the sub-paths 442, 444A-F, 446A-C, and 448. Based on a font size (e.g., display zoom level), the area of each of the sub-paths 442, 444A-F, 446A-C, and 448 are determined (e.g. calculated, computed, etc.). Based on a certain threshold value and the bounding box, some internal sub-paths (e.g., sub-paths 444A-F and 448) are removed, which is to say that at a certain area-threshold and zoom level, certain sub-paths will be removed. By way of example, the chart below illustrates an example calculated area and threshold value (i.e., 5) for excluding a sub-path from consideration for snap-line generation. At a certain area-threshold and zoom level, certain inner sub-paths will be removed/excluded.

| Path ID | Closed path Area | Outer/Inner Path | Exclude if closed path area is less than threshold (e.g. 5 unit) |
| --- | --- | --- | --- |
| 442 | 54 | Outer | No |
| 444A | 4.5 | Inner | Yes |
| 444B | 4.5 | Inner | Yes |
| 444C | 4.5 | Inner | Yes |
| 444D | 4.5 | Inner | Yes |
| 444E | 4.5 | Inner | Yes |
| 444F | 4.5 | Inner | Yes |

-continued

| Path ID | Closed path Area | Outer/Inner Path | Exclude if closed path area is less than threshold (e.g. 5 unit) |
| --- | --- | --- | --- |
| 446A | 7 | Outer | No |
| 446B | 6 | Outer | No |
| 446C | 4.7 | Outer | No |
| 448 | 35 | Inner | Yes |

Turning to FIG. 4H, FIG. 4H illustrates sub-paths that are available for snap-line generation using the example chart above. In FIG. 4H it can be seen that sub-paths 444A-F have been removed from the glyph "0" 440. sub-paths 444A-F were removed because the threshold value is 5, in this example, and the bounding box area of each of the sub-paths 444A-F was calculated as being less than the threshold value, at 4.5. Sub-paths 444A-F may appear again for snap-line generation if a zoom level is increased, thus potentially increasing the bounding box area above the threshold value. Notably in the example chart above, sub-path 446C was determined to have an area of 4.7, which is less than the threshold value of 5. However, sub-path 446C is still illustrated in FIG. 4H because sub-path 446C is not an inner sub-path and, thus, will not be removed from consideration for snap-line generation, regardless of the fact that the corresponding bounding box area is below the threshold value.

Figure 5A:
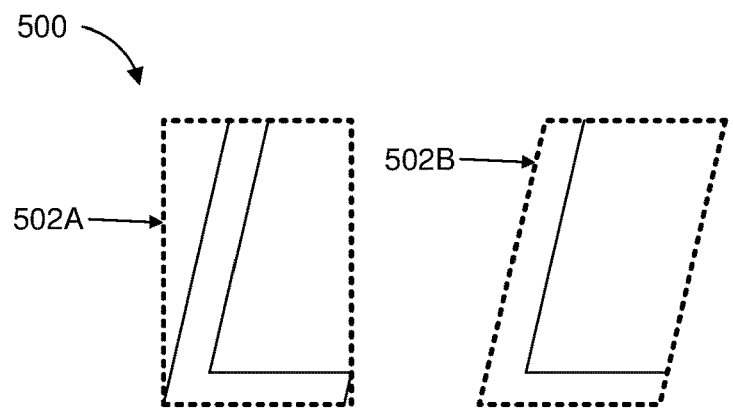
FIGS. 5A-5C illustrate an example glyph with an applied skew angle, in accordance with embodiments of the present invention.
Figure 5B:
Figure 5C:
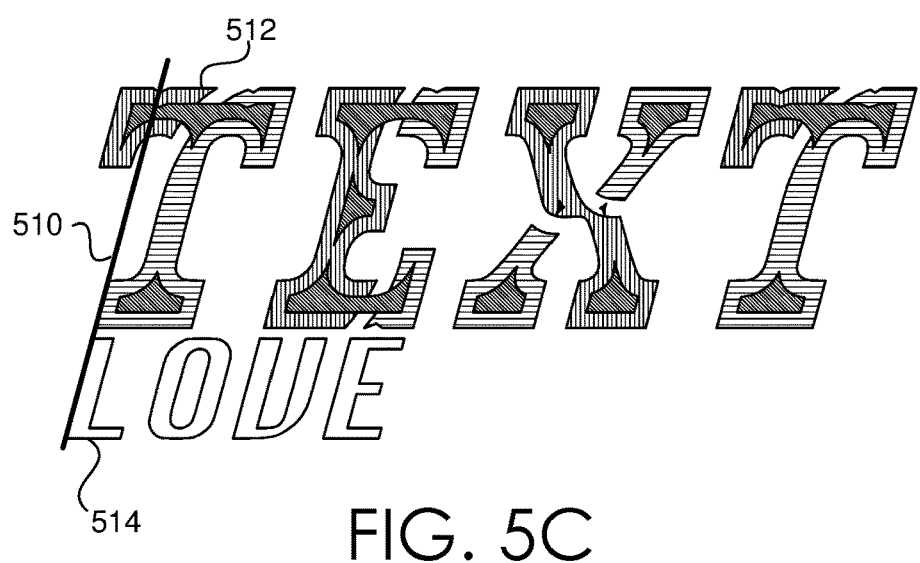

Now turning to FIGS. 5A-5C, FIGS. 5A-5C illustrate an example glyph 500 with an applied skew angle, in accordance with embodiments of the present invention. Initially, as seen in FIG. 5A, a bounding box 502A is determined for glyph 500. It is then determined that a skew angle has been applied to glyph 500, for example, by a user via a graphical user interface of a content editing application. The skew angle is then applied to bounding box 502A to generate bounding box 502B. As seen in FIG. 5A, the skew angle is applied only to vertical lines of the bounding box and the horizontal lines remain unchanged. This is not intended to be limiting and it is contemplated that a skew angle may also be applied to the horizontal lines of bounding box 502A/B in some embodiments.

FIG. 5B shows a set of potential snap-lines with an applied skew angle. These potential snap-lines are generated based on applying a skew angle to bounding boxes for each glyph. Turning to FIG. 5C, snap-lines function to aid a user in aligning objects in a document, similar to embodiments of the invention discussed herein. For example, when a user moves text 514 near text 512 and when a potential snap-line of the text 514 is within a threshold distance of a potential snap-line of the text 512, a snap-line 510 is generated and displayed to aid the user in aligning a portion of text 514 with a portion of text 512. Notably, the text 512 and text 514 remain live while each is moved by the user.

Figure 6:
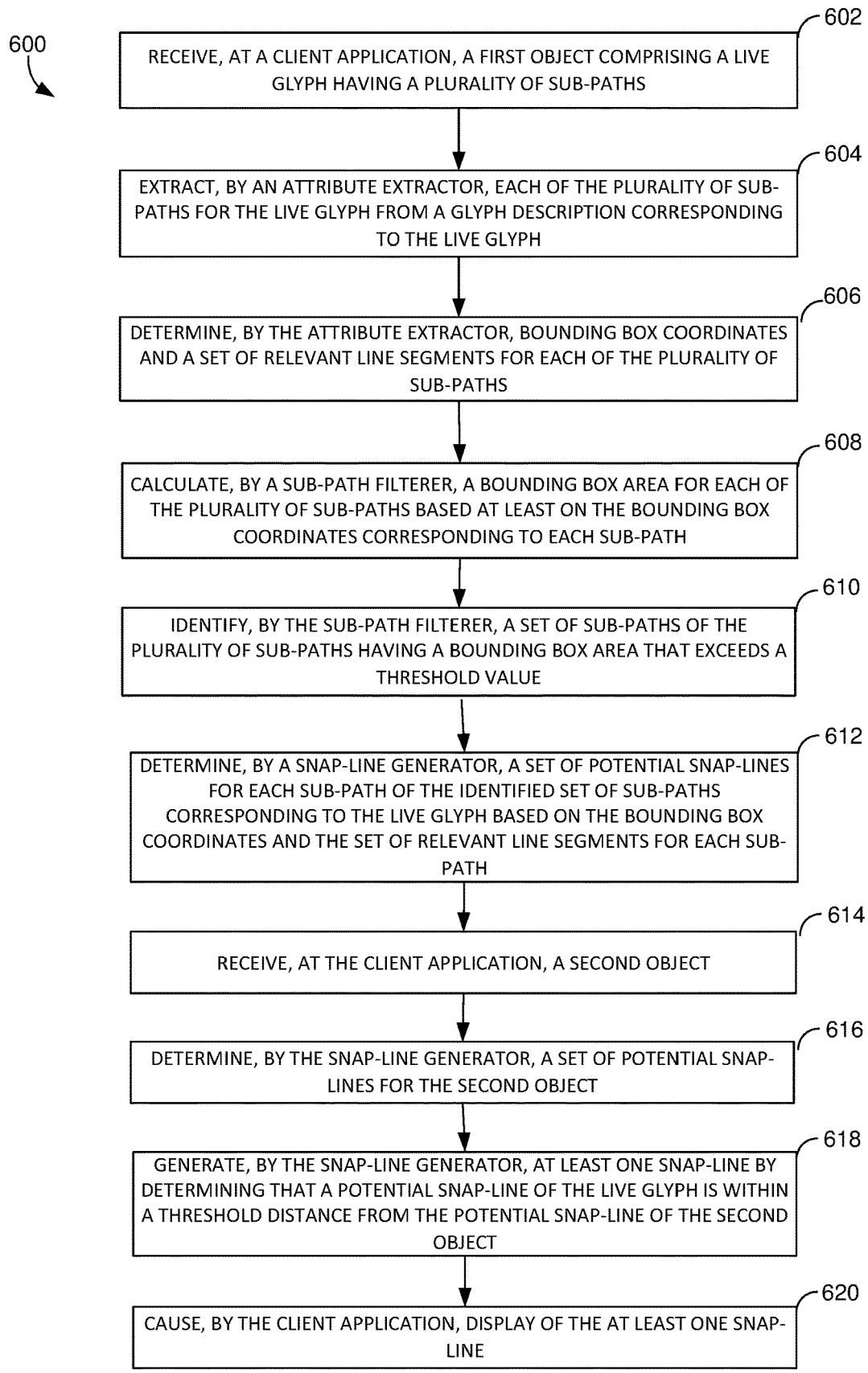
FIG. 6 illustrates a method for generating snap-lines, in accordance with embodiments described herein.
Figure 7:
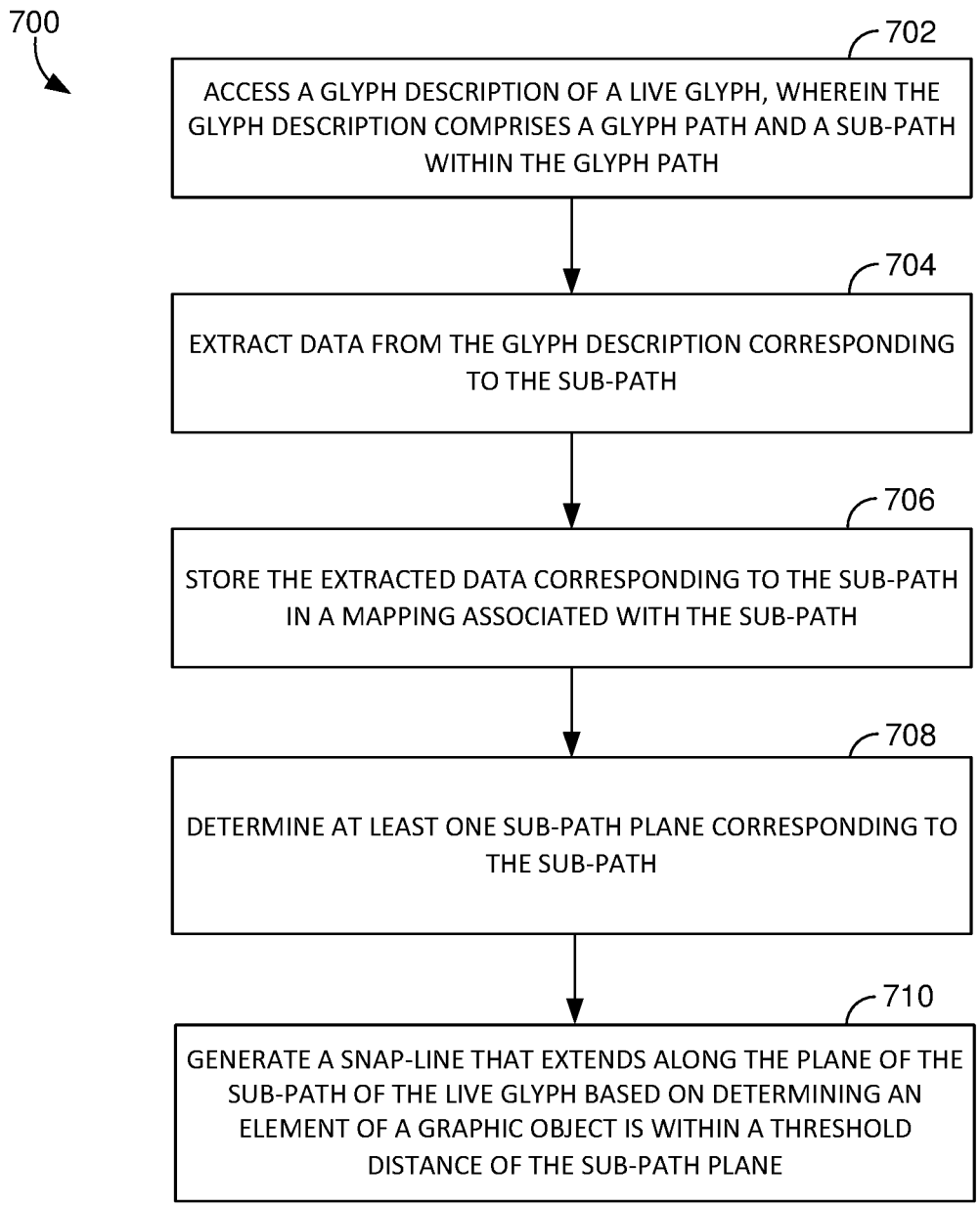
FIG. 7 illustrates a method for generating snap-lines, in accordance with embodiments described herein.

Now referring to FIGS. 6-7, each block of methods 600 and 700, described herein, comprises a computing process that may be performed using any combination of hardware, firmware, and/or software. For instance, various functions are carried out by a processor executing instructions stored in memory. The methods 600 and 700 may also be embodied as computer-usable instructions stored on computer storage media. The methods 600 and 700 may be provided by a standalone application, a service or hosted service (standalone or in combination with another hosted service), or a plug-in to another product, to name a few. In addition, methods 600 and 700 are described, by way of example, with respect to the system of FIG. 1. However, these methods may additionally or alternatively be executed by any one system, or any combination of systems, including, but not limited to, those described herein.

With reference to FIG. 6, FIG. 6 illustrates a method 600 for generating snap-lines, in accordance with embodiments described herein. Initially at block 602, a first object comprising a live glyph having a plurality of sub-paths is received at a client device. At block 604, each of the plurality of sub-paths for the live glyph is extracted by an attribute extractor from a glyph description corresponding to the live glyph. At block 606, bounding box coordinates and a set of relevant line segments for each of the plurality of sub-paths are determined by the attribute extractor. At block 608, a bounding box area for each of the plurality of sub-paths is calculated by a sub-path filterer based at least on the bounding box coordinates corresponding to each sub-path. At block 610, a set of sub-paths of the plurality of sub-paths having a bounding box area that exceeds a threshold value are identified by the sub-path filterer. At block 612, a set of potential snap-lines for each sub-path of the identified set of sub-paths corresponding to the live glyph are determined by a snap-line generator based on the bounding box coordinates and the set of relevant line segments for each sub-path. At block 614, a second object is received at the client application. At block 616, a set of potential snap-lines for the second object are determined by the snap-line generator. At block 618, at least one snap-line is generated, by the snap-line generator, by determining that a potential snap-line of the live glyph is within a threshold distance from the potential snap-line of the second object. At block 620, at least one snap-line is caused to be displayed by the client application.

With reference to FIG. 7, FIG. 7 illustrates a method 700 for generating snap-lines, in accordance with embodiments described herein. Initially at block 702, a glyph description of a live glyph is accessed, wherein the glyph description comprises a glyph path and a sub-path within the glyph path. At block 704, data from the glyph description corresponding to the sub-path is extracted. At block 706, the extracted data corresponding to the sub-path in a mapping associated with the sub-path is stored. At block 708, at least one sub-path plane corresponding to the sub-path is determined. At block 710, a snap-line that extends along the plane of the sub-path of the live glyph is generated based on determining an element of a graphic object is within a threshold distance of the sub-path plane.

Illustrative Computing Environment

Figure 8:
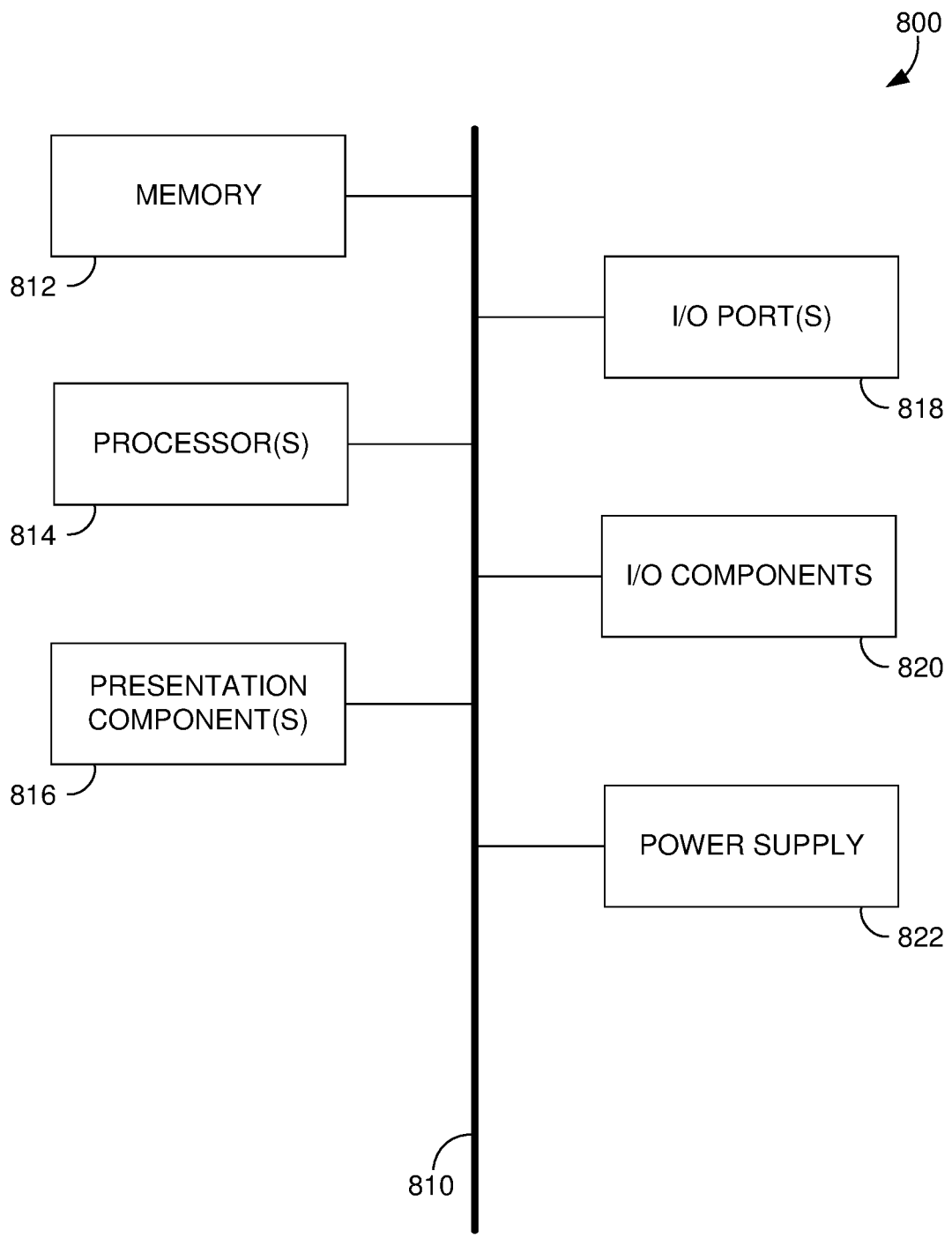
FIG. 8 is an example operating environment for implementing embodiments of the present invention.

Having briefly described an overview of embodiments of the present invention, an example operating environment in which embodiments of the present invention is implemented is described below in order to provide a general context for various aspects of the present invention. Referring initially to FIG. 8 in particular, an example operating environment for implementing embodiments of the present invention is shown and designated generally as computing device 800. Computing device 800 is but one example of a suitable computing environment and is not intended to suggest any limitation as to the scope of use or functionality of the invention. Neither should computing device 800 be interpreted as having any dependency or requirement relating to any one or combination of components illustrated.

The invention is described in the general context of computer code or machine-useable instructions, including computer-executable instructions such as program modules, being executed by a computer or other machine, such as a personal data assistant or other handheld device. Generally, program modules including routines, programs, objects, components, data structures, etc. refer to code that perform particular tasks or implement particular abstract data types. The invention is practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 8, computing device 800 includes bus 810 that directly or indirectly couples the following devices: memory 812, one or more processors 814, one or more presentation components 816, input/output ports 818, input/output components 820, and illustrative power supply 822. Bus 810 represents what is one or more buses (such as an address bus, data bus, or combination thereof). The various blocks of FIG. 8 are shown with lines for the sake of conceptual clarity, and other arrangements of the described components and/or component functionality are also contemplated. For example, one may consider a presentation component such as a display device to be an I/O component. Also, processors have memory. We recognize that such is the nature of the art and reiterate that the diagram of FIG. 8 is merely illustrative of an example computing device that can be used in connection with one or more embodiments of the present invention. Distinction is not made between such categories as "workstation," "server," "laptop," "hand-held device," etc., as all are contemplated within the scope of FIG. 8 and reference to "computing device."

Computing device 800 typically includes a variety of non-transitory computer-readable media. Non-transitory computer-readable media can be any available media that can be accessed by computing device 800 and includes both volatile and nonvolatile media, removable and non-removable media. By way of example, and not limitation, non-transitory computer-readable media may comprise non-transitory computer storage media and communication media.

Non-transitory computer storage media include volatile and nonvolatile, removable and non-removable media implemented in any method or technology for storage of information such as computer-readable instructions, data structures, program modules or other data. Non-transitory computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 800. Non-transitory computer storage media excludes signals per se.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 812 includes non-transitory computer storage media in the form of volatile and/or nonvolatile memory.

The memory is removable, non-removable, or a combination thereof. Exemplary hardware devices include solid-state memory, hard drives, optical-disc drives, etc. Computing device 800 includes one or more processors that read data from various entities such as memory 812 or I/O components 820. Presentation component(s) 816 present data indications to a user or other device. Exemplary presentation components include a display device, speaker, printing component, vibrating component, etc.

I/O ports 818 allow computing device 800 to be logically coupled to other devices including I/O components 820, some of which may be built in. Illustrative components include a microphone, joystick, game pad, satellite dish, scanner, printer, wireless device, etc.

With reference to the technical solution environment described herein, embodiments described herein support the technical solution described herein. The components of the technical solution environment can be integrated components that include a hardware architecture and a software framework that support constraint computing and/or constraint querying functionality within a technical solution system. The hardware architecture refers to physical components and interrelationships thereof, and the software framework refers to software providing functionality that can be implemented with hardware embodied on a device.

The end-to-end software-based system can operate within the system components to operate computer hardware to provide system functionality. At a low level, hardware processors execute instructions selected from a machine language (also referred to as machine code or native) instruction set for a given processor. The processor recognizes the native instructions and performs corresponding low-level functions relating, for example, to logic, control and memory operations. Low level software written in machine code can provide more complex functionality to higher levels of software. As used herein, computer-executable instructions include any software, including low level software written in machine code, higher level software such as application software and any combination thereof. In this regard, the system components can manage resources and provide services for system functionality. Any other variations and combinations thereof are contemplated with embodiments of the present invention.

By way of example, the technical solution system can include an API library that includes specifications for routines, data structures, object classes, and variables may support the interaction between the hardware architecture of the device and the software framework of the technical solution system. These APIs include configuration specifications for the technical solution system such that the different components therein can communicate with each other in the technical solution system, as described herein.

Having identified various components utilized herein, it should be understood that any number of components and arrangements are employed to achieve the desired functionality within the scope of the present disclosure. For example, the components in the embodiments depicted in the figures are shown with lines for the sake of conceptual clarity. Other arrangements of these and other components may also be implemented. For example, although some components are depicted as single components, many of the elements described herein are implemented as discrete or distributed components or in conjunction with other components, and in any suitable combination and location. Some elements may be omitted altogether. Moreover, various functions described herein as being performed by one or more entities are carried out by hardware, firmware, and/or software, as described below. For instance, various functions are carried out by a processor executing instructions stored in memory. As such, other arrangements and elements (e.g., machines, interfaces, functions, orders, and groupings of functions) can be used in addition to or instead of those shown.

Embodiments described in the paragraphs herein may be combined with one or more of the specifically described alternatives. In particular, an embodiment that is claimed may contain a reference, in the alternative, to more than one other embodiment. The embodiment that is claimed may specify a further limitation of the subject matter claimed.

The subject matter of embodiments of the invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" are used herein to connote different elements of methods employed, the terms should not be interpreted as implying any particular order among or between various steps herein disclosed unless and except when the order of individual steps is explicitly described.

For purposes of this disclosure, the word "including" has the same broad meaning as the word "comprising," and the word "accessing" comprises "receiving," "referencing," or "retrieving." Further the word "communicating" has the same broad meaning as the word "receiving," or "transmitting" facilitated by software or hardware-based buses, receivers, or transmitters using communication media described herein. In addition, words such as "a" and "an," unless otherwise indicated to the contrary, include the plural as well as the singular. Thus, for example, the constraint of "a feature" is satisfied where one or more features are present. Also, the term "or" includes the conjunctive, the disjunctive, and both (a or b thus includes either a or b, as well as a and b).

For purposes of a detailed discussion above, embodiments of the present invention are described with reference to a distributed computing environment; however, the distributed computing environment depicted herein is merely exemplary. Components can be configured for performing novel aspects of embodiments, where the term "configured for" can refer to "programmed to" perform particular tasks or implement particular abstract data types using code. Further, while embodiments of the present invention generally refer to the technical solution environment and the schematics described herein, it is understood that the techniques described are extended to other implementation contexts.

Embodiments of the present invention have been described in relation to particular embodiments which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects hereinabove set forth together with other advantages which are obvious and which are inherent to the structure. It will be understood that certain features and sub-combinations are of utility and are employed without reference to other features or sub-combinations. This is contemplated by and is within the scope of the claims.

What is claimed is:

1. A method comprising:
   receiving, at a client application, a first object comprising a live glyph having a plurality of sub-paths;
   extracting, by an attribute extractor, each of the plurality of sub-paths for the live glyph from a glyph description corresponding to the live glyph;
   determining, by the attribute extractor, bounding box coordinates and a set of relevant line segments for each of the plurality of sub-paths;
   calculating, by a sub-path filterer, a bounding box area for each of the plurality of sub-paths based at least on the bounding box coordinates corresponding to each sub-path;
   identifying, by the sub-path filterer, a set of sub-paths of the plurality of sub-paths having a bounding box area that exceeds a threshold value;
   determining, by a snap-line generator, a set of potential snap-lines for each sub-path of the identified set of sub-paths corresponding to the live glyph based on the bounding box coordinates and the set of relevant line segments for each sub-path;
   receiving, at the client application, a second object;
   determining, by the snap-line generator, a set of potential snap-lines for the second object;
   generating, by the snap-line generator, at least one snap-line by determining that a potential snap-line of the live glyph is within a threshold distance from the potential snap-line of the second object; and
   causing, by the client application, display of the at least one snap-line.

2. The method of claim 1, further comprising:
   determining, by the snap-line generator, that the second object is within a threshold distance of the snap-line; and
   causing the second object to automatically align with the snap-line.

3. The method of claim 1, further comprising generating a bounding box for each of the plurality of sub-paths based on the glyph description.

4. The method of claim 3, further comprising:
   accessing, by the snap-line generator, a skew angle applied to the live glyph; and
   applying the skew angle to each bounding box.

5. The method of claim 1, further comprising:
   tagging, by the attribute extractor, each sub-path of the plurality of sub-paths as an inner sub-path or an outer sub-path, wherein a sub-path that is fully enclosed by another sub-path is tagged as an inner sub-path and a sub-path that is not fully enclosed by another sub-path is tagged as an outer sub-path.

6. The method of claim 1, further comprising assigning, by the attribute extractor, a unique identifier to each sub-path of the plurality of sub-paths.

7. The method of claim 1, wherein calculating a bounding box area for each of the plurality of sub-paths is further based on a determined zoom level associated with the live glyph.

8. A computerized system comprising:
   one or more computer processors; and
   computer memory storing computer-useable instructions that, when used by the one or more computer processors, cause the one or more computer processors to perform operations comprising:
   accessing, by an attribute extractor, a glyph description of a live glyph comprising a glyph path and a sub-path within the glyph path;
   extracting, by the attribute extractor, data from the glyph description corresponding to the sub-path;
   storing, by the attribute extractor, the extracted data corresponding to the sub-path in a mapping associated with the sub-path;
   determining, by a snap-line generator, at least one sub-path plane corresponding to the sub-path; and
   based on determining an element of a graphic object is within a threshold distance of the sub-path plane, generating, by a snap-line generator, a snap-line that extends along the plane of the sub-path of the live glyph.

9. The system of claim 8, further comprising:
   determining, by the snap-line generator, that the element of the object is within a threshold distance of the snap-line; and
   causing the element of the graphic object to automatically align with the snap-line.

10. The system of claim 8, further comprising generating, by the snap-line generator, a bounding box for the sub-path based on the glyph description.

11. The system of claim 10, further comprising:
    accessing, by the snap-line generator, a skew angle applied to the live glyph; and
    applying, by the snap-line generator, the skew angle to the bounding box for the sub-path.

12. The system of claim 8, further comprising:
    tagging, by the attribute extractor, the sub-path as an inner sub-path, wherein an inner sub-path is fully enclosed by a second sub-path; and
    identifying, by the snap-line generator, a bounding box area of the sub-path based on a generated bounding box for the sub-path, a font size for the live glyph and a zoom level for displaying the live glyph.

13. The system of claim 8, wherein the mapped data includes a unique identifier, a tag to identify the sub-path as an inner or outer sub-path, bounding box information, and relevant line segments.

14. The system of claim 8, further comprising:
    determining, by the snap-line generator, a bounding box array for the live glyph, wherein the bounding box array includes a bounding box for each sub-path of the live glyph;
    determining, by the snap-line generator, a line array for the live glyph, wherein the line array incudes a line segment of each straight line of each sub-path of the live glyph; and
    removing, by the snap-line generator, common line segments from the line array, wherein a common line segment is a line segment that shares the same path as a portion of at least one bounding box of the bounding box array.

15. A system comprising:
    means for accessing, by an attribute extractor, a glyph description of a live glyph comprising a glyph path and a sub-path within the glyph path;
    means for extracting data, by the attribute extractor, from the glyph description corresponding to the sub-path;
    means for storing, by the attribute extractor, the extracted data corresponding to the sub-path in a mapping associated with the sub-path;
    means for determining, by a snap-line generator, at least one sub-path plane corresponding to the sub-path; and
    means for generating, by the snap-line generator, a snap-line that extends along the plane of the sub-path of the live glyph based on determining a plane of a graphic object is within a threshold distance of the sub-path plane.

16. The system of claim 15, further comprising:
determining, by the snap-line generator, that the plane of the object is within a threshold distance of the snap-line; and
causing the plane of the graphic object to automatically align with the snap-line.

17. The system of claim 15, further comprising generating, by the snap-line generator, a bounding box for the sub-path based on the glyph description.

18. The system of claim 15, further comprising filtering out, by a sub-path filterer, a second sub-path based on determining a bounding box area associated with the second sub-path area is less than a threshold area.

19. The system of claim 15, further comprising:
tagging, by the attribute extractor, the sub-path as an inner sub-path, wherein an inner sub-path is fully enclosed by a second sub-path; and
identifying, by the snap-line generator, a bounding box area of the sub-path based on a generated bounding box for the sub-path, a font size for the live glyph and a zoom level for displaying the live glyph.

20. The system of claim 15, further comprising:
determining, by the snap-line generator, a bounding box array for the live glyph, wherein the bounding box array includes a bounding box for each sub-path of the live glyph;
determining, by the snap-line generator, a line array for the live glyph, wherein the line array incudes a line segment of each straight line of each sub-path of the live glyph; and
removing, by the snap-line generator, common line segments from the line array, wherein a common line segment is a line segment that shares the same path as a portion of at least one bounding box of the bounding box array.

* * * * *

UNITED STATES PATENT AND TRADEMARK OFFICE
CERTIFICATE OF CORRECTION

| | |
|---|---|
| PATENT NO. | : 11,367,231 B2 |
| APPLICATION NO. | : 17/077496 |
| DATED | : June 21, 2022 |
| INVENTOR(S) | : Kumawat et al. |

It is certified that error appears in the above-identified patent and that said Letters Patent is hereby corrected as shown below:

In the Claims

Column 20, Line 47:
Claim 14
The line reading "the live glyph, wherein the line array incudes a line" should read -- the live glyph, wherein the line array includes a line --.

Column 22, Line 11:
Claim 20
The line reading "the live glyph, wherein the line array incudes a line" should read -- the live glyph, wherein the line array includes a line --.

Signed and Sealed this
Twenty-third Day of August, 2022

*Katherine Kelly Vidal*

Katherine Kelly Vidal
*Director of the United States Patent and Trademark Office*